(12) United States Patent
Hulan et al.

(10) Patent No.: US 7,511,861 B2
(45) Date of Patent: Mar. 31, 2009

(54) MULTI-PAGE FACSIMILE METHOD AND DEVICE

(75) Inventors: Greg Hulan, San Diego, CA (US); Scott Imoto, Vista, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1219 days.

(21) Appl. No.: 10/232,929

(22) Filed: Aug. 30, 2002

(65) Prior Publication Data

US 2004/0042049 A1 Mar. 4, 2004

(51) Int. Cl.
*H04N 1/00* (2006.01)

(52) U.S. Cl. .................. 358/404; 358/505; 358/1.15; 358/401; 358/412; 358/409; 358/468; 358/434; 358/444; 358/405; 358/406; 358/407; 379/100.01; 379/100.06

(58) Field of Classification Search .............. 358/505, 358/401, 1.15, 412, 409, 404, 468, 434, 444, 358/406, 407; 379/100.01, 100.06

See application file for complete search history.

(56) References Cited

U.S. PATENT DOCUMENTS

| | | | | |
|---|---|---|---|---|
| 5,422,705 A * | 6/1995 | Omelchenko et al. | ......... | 399/43 |
| 5,627,661 A * | 5/1997 | Negishi et al. | ............. | 358/470 |
| 5,699,169 A * | 12/1997 | Nakatani et al. | ........... | 358/3.07 |
| 5,712,713 A * | 1/1998 | Hamanaka et al. | .......... | 358/451 |
| 5,715,070 A * | 2/1998 | Tone et al. | ................... | 358/468 |
| 5,737,454 A * | 4/1998 | Park et al. | ................... | 382/284 |
| 5,854,692 A * | 12/1998 | Nakatani | ....................... | 358/468 |
| 5,903,362 A * | 5/1999 | Tanaka | ......................... | 358/468 |
| 5,920,405 A * | 7/1999 | McIntyre et al. | ............ | 358/442 |
| 5,963,216 A * | 10/1999 | Chiarabini et al. | .......... | 345/660 |
| 5,987,535 A * | 11/1999 | Knodt et al. | .................. | 710/15 |
| 6,104,420 A * | 8/2000 | Matsumoto | .................. | 347/133 |
| 6,151,133 A * | 11/2000 | Sakauchi et al. | ........... | 358/1.15 |
| 6,191,870 B1 * | 2/2001 | Takayanagi | ................. | 358/450 |
| 6,301,010 B1 * | 10/2001 | Kajita | ......................... | 358/1.13 |
| 6,321,266 B1 * | 11/2001 | Yokomizo et al. | ........... | 709/226 |
| 6,323,962 B1 * | 11/2001 | Itoh et al. | .................... | 358/468 |
| 6,343,196 B1 * | 1/2002 | Yun et al. | ...................... | 399/81 |
| 6,385,412 B1 * | 5/2002 | Sadakuni | ..................... | 399/75 |
| 6,417,935 B1 * | 7/2002 | Saito et al. | .................. | 358/450 |
| 6,424,429 B1 * | 7/2002 | Takahashi et al. | .......... | 358/1.16 |
| 6,437,870 B1 * | 8/2002 | Yoshida et al. | ............. | 358/1.15 |
| 6,437,871 B1 * | 8/2002 | Yuki | .......................... | 358/1.15 |
| 6,466,336 B1 * | 10/2002 | Sturgeon et al. | ............ | 358/444 |
| 6,529,918 B2 * | 3/2003 | Takahashi | .................... | 707/205 |
| 6,552,826 B2 * | 4/2003 | Adler et al. | ................. | 358/442 |
| 6,559,980 B1 * | 5/2003 | Joffe | ........................... | 358/442 |
| 6,570,667 B1 * | 5/2003 | Hattori et al. | .............. | 358/1.15 |
| 6,650,794 B1 * | 11/2003 | Aoki | ........................... | 382/306 |
| 6,678,065 B1 * | 1/2004 | Hikawa | ....................... | 358/1.13 |
| 6,744,535 B2 * | 6/2004 | Chimura et al. | ............. | 358/407 |
| 6,816,282 B2 * | 11/2004 | Tachibana et al. | ............ | 358/1.4 |

(Continued)

*Primary Examiner*—David K. Moore
*Assistant Examiner*—Benjamin O Dulaney

(57) ABSTRACT

A method of faxing a multi-page job via a facsimile device. Accordingly, the method includes scanning a page of the multi-page job with the facsimile device, encoding the scanned page as a fax signal, and loading the fax signal into a buffer memory. Each page of the multi-page job is scanned, encoded, and loaded. The method further includes transmitting the fax signals encoded from each page of the multi-page job from the buffer memory to a recipient fax device in a single transmission.

23 Claims, 3 Drawing Sheets

U.S. PATENT DOCUMENTS

| | | | |
|---|---|---|---|
| 6,826,384 B2* | 11/2004 | Dobbertin et al. | 399/394 |
| 6,833,926 B1* | 12/2004 | Takano et al. | 358/1.15 |
| 6,839,148 B1* | 1/2005 | Matsuzoe et al. | 358/1.15 |
| 6,862,114 B1* | 3/2005 | Hayashi | 358/437 |
| 6,882,711 B1* | 4/2005 | Nicol | 379/93.33 |
| 6,980,320 B2* | 12/2005 | Ito | 358/1.18 |
| 6,990,195 B1* | 1/2006 | LeBlanc et al. | 379/406.08 |
| 7,006,241 B1* | 2/2006 | Yamamoto | 358/1.15 |
| 7,119,931 B2* | 10/2006 | Miyamoto et al. | 358/474 |
| 7,177,529 B2* | 2/2007 | Yoshida et al. | 386/117 |
| 2002/0030849 A1* | 3/2002 | Takamiya | 358/1.15 |
| 2002/0075509 A1* | 6/2002 | Wiechers | 358/1.15 |
| 2003/0221026 A1* | 11/2003 | Newman | 710/8 |
| 2004/0042049 A1* | 3/2004 | Hulan et al. | 358/404 |

* cited by examiner

MULTI-PAGE FACSIMILE METHOD AND DEVICE

BACKGROUND

Many facsimile devices are equipped with automatic document feeders that automatically position documents for input by the facsimile device. Such automatic document feeders may be particularly useful when a user wants to fax a multi-page job, because the user can load the entire job into the automatic document feeder and not be required to take further action. However, for some users, the cost of adding an automatic document feeder to a facsimile device may outweigh the benefit, and some devices are not equipped with automatic document feeders for this reason. Some users also prefer the size and clean look of a device without an automatic document feeder. Nevertheless, users who prefer facsimile devices without automatic document feeders may want to transmit multi-page jobs. Similarly, some users may want to transmit unconventionally sized jobs that an automatic document feeder is incapable of handling.

SUMMARY

A method of faxing a multi-page job via a facsimile device is provided. Accordingly, the method includes scanning a page of the multi-page job with the facsimile device, encoding the scanned page as a fax signal, and loading the fax signal into a buffer memory. Each page of the multi-page job is scanned, encoded, and loaded. The method further includes transmitting the fax signals encoded from each page of the multi-page job from the buffer memory to a recipient fax device in a single transmission.

DETAILED DESCRIPTION

Figure 1:
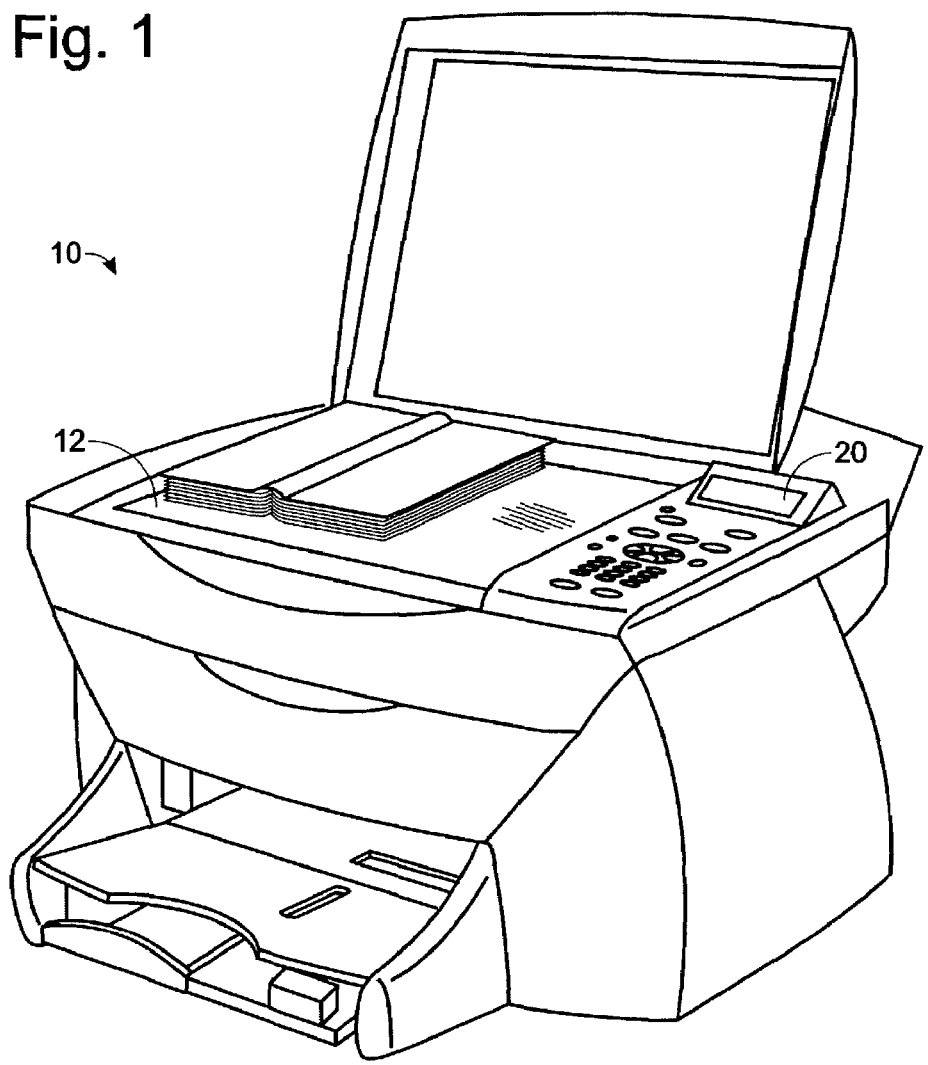
FIG. 1 is an isometric view of a flatbed facsimile device that is configured to fax multi-page jobs without an automatic document feeder.
Figure 2:
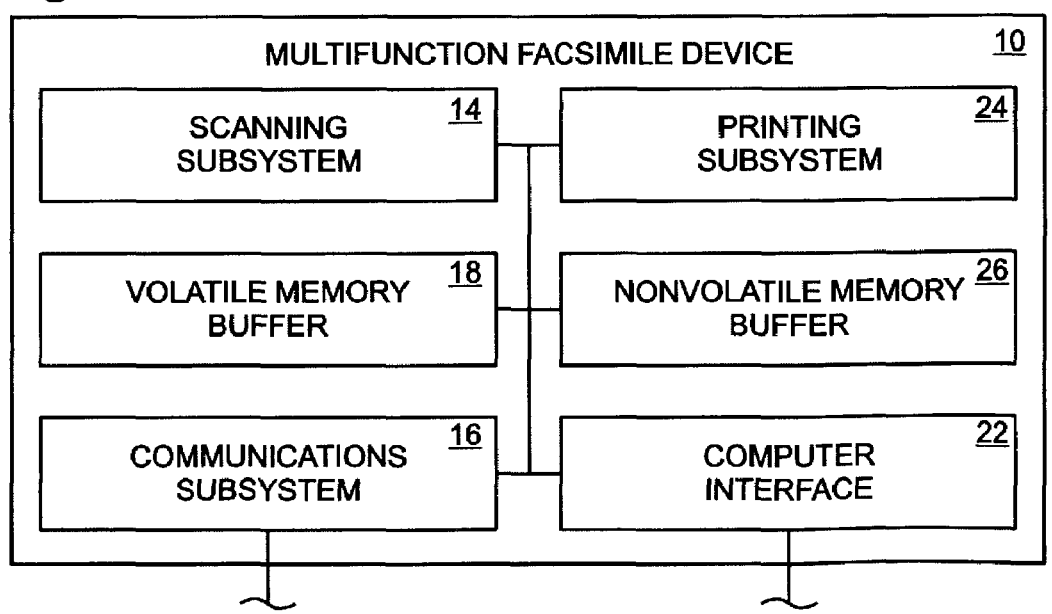
FIG. 2 is a schematic representation of the flatbed facsimile device of FIG. 1.

FIGS. 1 and 2 show an exemplary flatbed facsimile (fax) device 10. Fax device 10 includes a scanning area 12, which is configured to receive items for faxing, such as papers, books, photographs, etc. Such items are herein referred to as a "job" or "fax job." The scanning area typically includes a transparent surface upon which the fax job may be placed. If a fax job consists of more than one page, or otherwise cannot be completely scanned in a single scan because it is too large to fit on the scanning area, for instance, the job is referred to as a "multi-page" job. Fax device 10 is configured to scan and transmit multi-page fax jobs by individually scanning the constituent pages, portions, or other parts (herein generally referred to as "pages") that make up a multi-page job.

Fax device 10 includes a scan head (not shown), which may be configured to scan a job positioned on the scanning area. The scan head may include a charge-coupled device (CCD) or an array of CCDs, which are light-sensitive integrated circuits that store and display the data for an image in such a way that each pixel in the image is converted into an electric charge which represents a color or shade of gray. The scan head may alternatively include a contact image sensor (CIS) or other suitable mechanism for recording an image from the scanning area.

The scanning area and scan head are components of a scanning subsystem, schematically depicted at 14 in FIG. 2, which is configured to scan a job of one or more pages and encode the job as a fax-job signal. The fax-job signal may include one or more fax signals that respectively correspond to the individual pages of a multi-page job. The fax signals, either individually, or collectively as a fax-job signal, are adapted to be transmitted by a communication subsystem, schematically depicted at 16 in FIG. 2, to a recipient fax device. It will be appreciated, however, that fax signal, as used herein, is intended to refer to an encoded representation of a page of a fax job, regardless of format. Furthermore, in some embodiments, the fax signal may transition from one format to another between encoding and transmission.

The entire multi-page job may be transmitted in a single transmission. Fax transmissions typically are sent according to a predetermined digitization and compression scheme via the same telephone networks used to transmit standard telephone communications, although other networks may be used. The recipient fax machine will typically terminate a fax transmission due to a lack of network activity if it does not receive a fax signal for a specific period of time. The specific time period may vary depending on the fax protocol, but typically ranges from about 5 to 60 seconds. Therefore, it is desirable to prevent a fax transmission from exceeding this period without sending any signal.

Flatbed fax device 10 may be configured to transmit a multi-page job by encoding each scanned page of the multi-page job as a fax signal and loading the fax signal directly into a volatile memory buffer, shown at 18 in FIG. 2. After the entire multi-page job has been scanned, encoded, and loaded into the buffer, each respective fax signal may be transmitted directly from the buffer to a recipient fax device in a single transmission. Because the complete job is loaded into the buffer before transmission begins, the complete job may be transmitted without causing a delay of sufficient duration to cause the recipient fax device to terminate the transmission. In other words, a multi-page job may be completely scanned one page at a time, and each page of the job may be respectively held in a buffer until the complete fax job is loaded into the buffer. The complete job may then be sent to a recipient fax device in a single transmission, which does not have to be initiated until the multi-page job is completely scanned.

According to the above, the pages of the multi-page fax job are scanned, encoded, and loaded directly into buffer memory as fax signals. Because the job does not need to be permanently stored, there is no need to convert the job into a format suitable for long term storage. Therefore, no unnecessary file conversions need be performed and the fax job does not need to be loaded into nonvolatile memory. In contrast, the pages may be directly encoded to a format suitable for facilitating fax transmission and directly loaded into the buffer without first being loaded into nonvolatile memory. Similarly, once the complete fax job has been loaded into the buffer, the fax signals may be directly transmitted to a recipient fax device without first being loaded into nonvolatile memory.

The transmission may be either automatically or manually initiated. For example, the fax device may be configured to recognize that no additional pages of a multi-page job are being scanned, and may automatically initiate a fax transmission and send all pages currently held in the buffer. Upon recognizing that no additional pages are being scanned, the fax device may instead notify a user, and may await a command to initiate transmission. In some embodiments, the device may only initiate a transmission after receiving a notification (from a user) signaling that the multi-page job is completely scanned. In this manner, transmissions will not accidentally be initiated before the complete job is loaded into the buffer.

In some instances, the volatile memory buffer may not be large enough to hold an entire multi-page fax job. In such instances, the complete fax job cannot be directly loaded into the buffer. This may occur, for instance, when faxing pages that include color, photographic data, and/or other information that is encoded into relatively large fax signals. Where the entire fax job cannot be held in the buffer, some of the job must be transmitted before the entire job is scanned. In other words, transmission of at least one fax signal encoded from a page of the multi-page job must begin before the multi-page job is completely scanned. When this is done, however, sufficient periods of network inactivity may cause the transmission to terminate, effectively forcing the multi-page fax job to be sent over the course of two or more transmissions.

Fax device 10 may be configured to prevent fax transmissions from terminating due to a lack of network activity. A user interface, such as that shown at 20 of FIG. 1, may prompt a user to scan consecutive pages of a multi-page job within an allotted period of time. The allotted time may be sufficiently short so that periods of network inactivity are not long enough to cause the fax transmission to terminate. For example, after a user has scanned a first page of a multi-page job, an onboard processor may start a countdown timer to signal (via the user interface, a speaker, or similar device) the time at which the multi-page job will be deemed completely scanned, if no other pages are added to the fax transmission. If a user scans another page within the allotted period of time, the timer resets, and more pages may be scanned. This cycle may repeat until either the user does not scan another document within the allotted period of time, or the user affirmatively indicates that the job is completely scanned and ready to transmit. As described herein, the allotted period of time may be lengthened, allowing a user more time to add pages to the multi-page job.

The countdown timer may be presented on a display and/or may be audibly presented to a user, such as by a countdown of a recorded or synthesized voice, or one or more tones. The length of the countdown may be selected according to the particular fax protocol being used, and how much network inactivity may be tolerated before a fax transmission will be terminated. Periods ranging from a few seconds to several minutes are appropriate. Of course, other suitable mechanisms may be used to notify a user of a period in which additional pages may be scanned, and a countdown timer is provided as a non-limiting example.

The period allotted between scans may be lengthened by purposefully slowing the transmission of fax signals that have already been encoded, thus lengthening the period of network activity and shortening the corresponding period of network inactivity. Slowing the fax transmission may provide a user with more time to scan subsequent pages before the fax transmission will be terminated. The extent to which the fax transmission may be slowed is typically dependent on the particular fax protocol being used. The fax device may be configured to take full advantage of the extent to which the fax transmission may be slowed. The fax device may also be configured to automatically alter the transmission speed during transmission. For example, transmissions may initially begin relatively slowly, and then automatically speed up if, for example, the memory buffer fills, or a subsequent page is scanned. If the buffer is no longer full, or no additional pages are being scanned, the transmission may slow.

The fax device may be configured to send supplemental information to prevent network inactivity from terminating a fax transmission. As used herein, supplemental information means information that is not directly used to reproduce a scanned image on a recipient fax device. The supplemental information may be primarily used to keep the fax transmission active. Examples of supplemental information may include fill bits, error correction mode (ECM) flags, and header lines intentionally configured to compress inefficiently. Fill bits may be transmitted as a portion of a fax signal, and typically are not used to reproduce the fax job at a recipient fax device. The fill bits may be ignored by the recipient fax device, or they may be configured so that they otherwise do not affect the resulting reproduced image. The fill bits are typically added to the end of each line of data. ECM flags typically prevent a recipient fax device from terminating a fax transmission. A transmitting fax device should be able to send 35±5 seconds of flags after each frame before the recipient fax device terminates the fax transmission. However, some fax devices do not conform to this specification. Regardless of conformity to the specification, lines of information may be added to the header in order to slow the transmission. A line added to the header may be purposefully configured to compress very poorly, and thus take relatively longer to transmit.

As described herein, fax device 10 does not require an automatic document feeder to send multi-page fax jobs in a single transmission. Furthermore, fax device 10 may scan a variety of items that are incompatible with an automatic document feeder. Manual scanning without an automatic document feeder may be substantially more versatile than automatic feed scanning with an automatic document feeder. For example, the pages from a bound book may be individually manually positioned on scanning area 12. Similarly, various portions of a poster or other oversized item may be individually manually positioned over the scanning area. These items may be scanned, encoded, and transmitted as a multi-page job in a single fax transmission. However, an automatic document feeder may not be able to process them.

In general, the flatbed configuration of fax device 10 allows the device to fax virtually any item, no matter how small, large, and/or awkwardly shaped the item may be. Furthermore, such items may be variously combined into a single multi-page fax job. It is within the scope of the invention to use scanning arrangements other than a flatbed scanner. For example, a handheld scanner or a photo scanner may be used. Also, it is within the scope of the invention to equip faxing device 10 with an optional document feeder, which may be used to selectively receive appropriately sized multi-page jobs.

As depicted in FIGS. 1 and 2, fax device 10 may be, but is not required to be, a multifunction device capable of performing tasks other than faxing. For example, fax device 10 may include a computer interface 22 configured to facilitate communication between the fax device and a computing device (not shown), such as a personal computer, mobile computing device, networked computer, etc. The computer interface may implement any of a variety of appropriate technologies, including universal serial bus (USB), USB 2.0, IEEE.1394, parallel port, serial port, BlueTooth, WiFi (IEEE 802.11), IrDA, etc. When interfaced with a computing device, the fax device may act as a scanner that is capable of transferring images scanned by the scanning subsystem and encoded as computer readable files to the computing device for long-term storage and/or processing. The fax device may also include a printing subsystem 24 capable of producing printed media. The printing subsystem may include an inkjet, laser, thermal, and/or other suitable printing mechanism. The printing subsystem may be configured to print images received from a computing device via the computer interface, images copied from the scanning subsystem, images received via the communications subsystem (such as an incoming fax transmission), and/or other images (such as those received via a memory card reader). The fax device may also include a nonvolatile memory 26, which may be capable of permanently storing information, unlike the volatile memory buffer.

Figure 3:
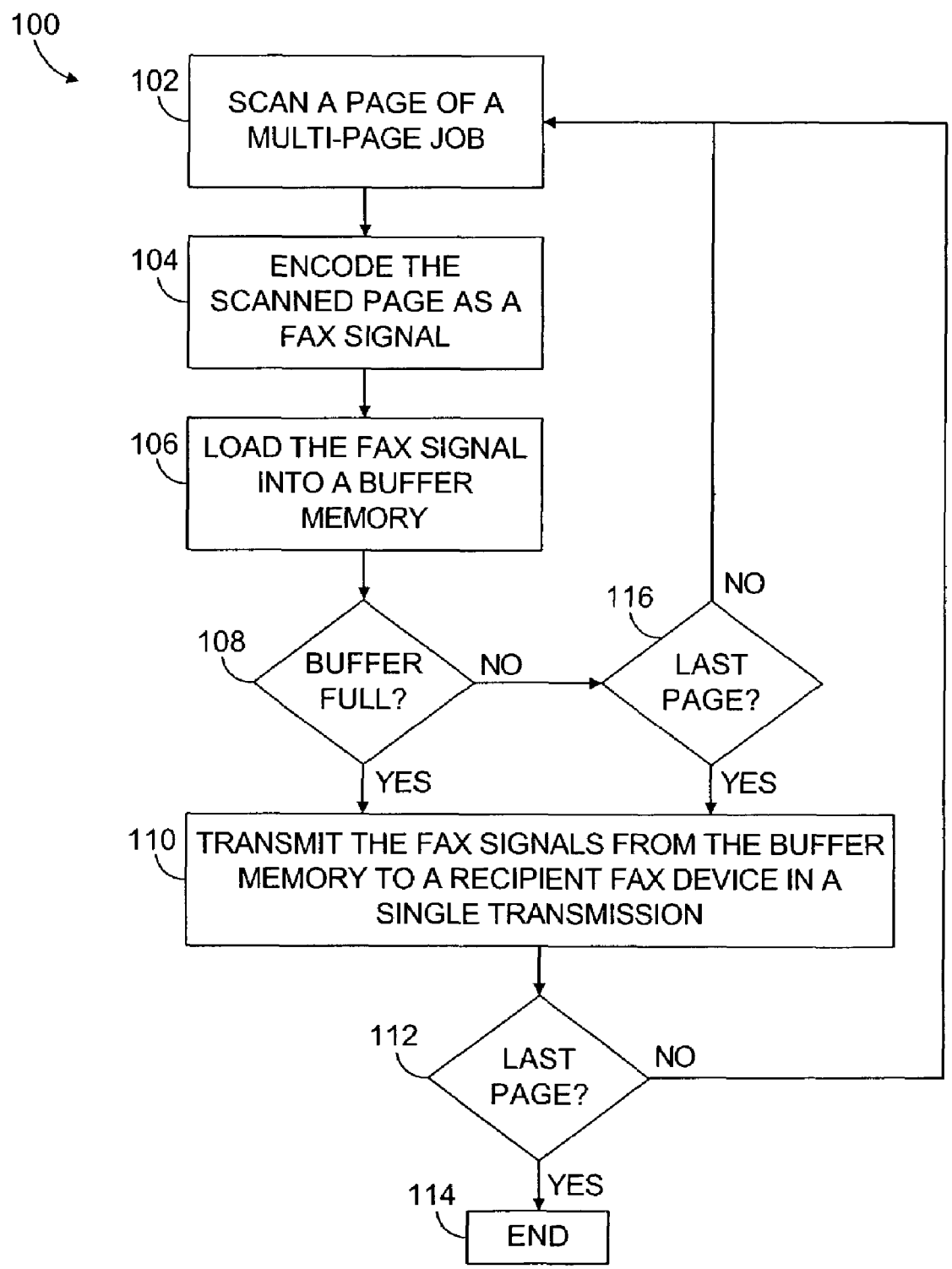
FIG. 3 is a flowchart showing one exemplary method of faxing a multi-page job without an automatic document feeder.

FIG. 3 shows, generally at 100, a method of faxing a multi-page job. Method 100 includes, at 102, scanning a page of the multi-page job. As described above, virtually any size and/or shape of page may be scanned where an automatic document feeder is not employed. At 104, the method further includes, encoding the scanned page as a fax signal. The fax signal may be adapted to be transmitted via a network, and received by a recipient fax device, which may produce a reproduction of the scanned page from the fax signal. The method also includes, at 106, loading the fax signal directly into a buffer memory.

At 108, the method may proceed in one of two ways. As shown at 110, the fax signal may ,be transmitted from the buffer memory to a recipient fax device if the buffer memory is full. The fax signal may also be transmitted if the buffer memory is filled to a threshold percentage, or if a user has selected an option to transmit each page after it is scanned. Transmission of the fax signal may be purposefully slowed, so as to keep the fax transmission active for a longer period of time, thus permitting a user more time to scan another page of a multi-page job. The transmission may be slowed by transmitting supplemental information, such as fill bits, ECM flags, or poorly compressed header lines. A user may be provided an allotted period of time for scanning an additional page, and the allotted period of time may reset when an additional page is scanned.

At 112, a determination may be made as to whether the previously scanned and transmitted page is the last page of the multi-page job. This may be accomplished in a variety of ways. For example, a user may affirmatively select an option indicating that the multi-page job is completely scanned. Alternatively or additionally, the fax device may infer that the job is completely scanned if a user does not scan another page within an allotted period of time (the allotted period of time expires), such as a period indicated by a countdown timer. If it is deemed that the previous page is the last page, the fax transmission may be terminated after all of the fax signals are transmitted, as shown at 114.

At 108, if the buffer is not full (or not filled to a predetermined threshold), and the user has not set the fax device to transmit after each scan, a determination is made as to whether the previously scanned and transmitted page is the last page of the multi-page job, as shown at 116. If it is determined that the previously scanned page is the last page, fax signals held in the buffer are transmitted to a recipient fax device in a single transmission. In this case, a determination as to the last page need not be made again, and the method may end at 114.

At 112 and 116, if a determination is made that the previously-scanned page is not the last page of the multi-page job, for example, because a user begins scanning another page or otherwise affirmatively indicates that there are additional pages, another page may be scanned, as shown at 102. This cycle may continue until the last page of the multi-page job is scanned. The buffer memory may be filled (or partially filled) and emptied several times during the processing of a single fax job, or the buffer memory may be emptied only once, depending on the number and complexity of the individual pages of the multi-page job. The fax transmission may be automatically controlled to slow down or speed up to optimize throughput, while maintaining an active fax transmission.

Figure 4:
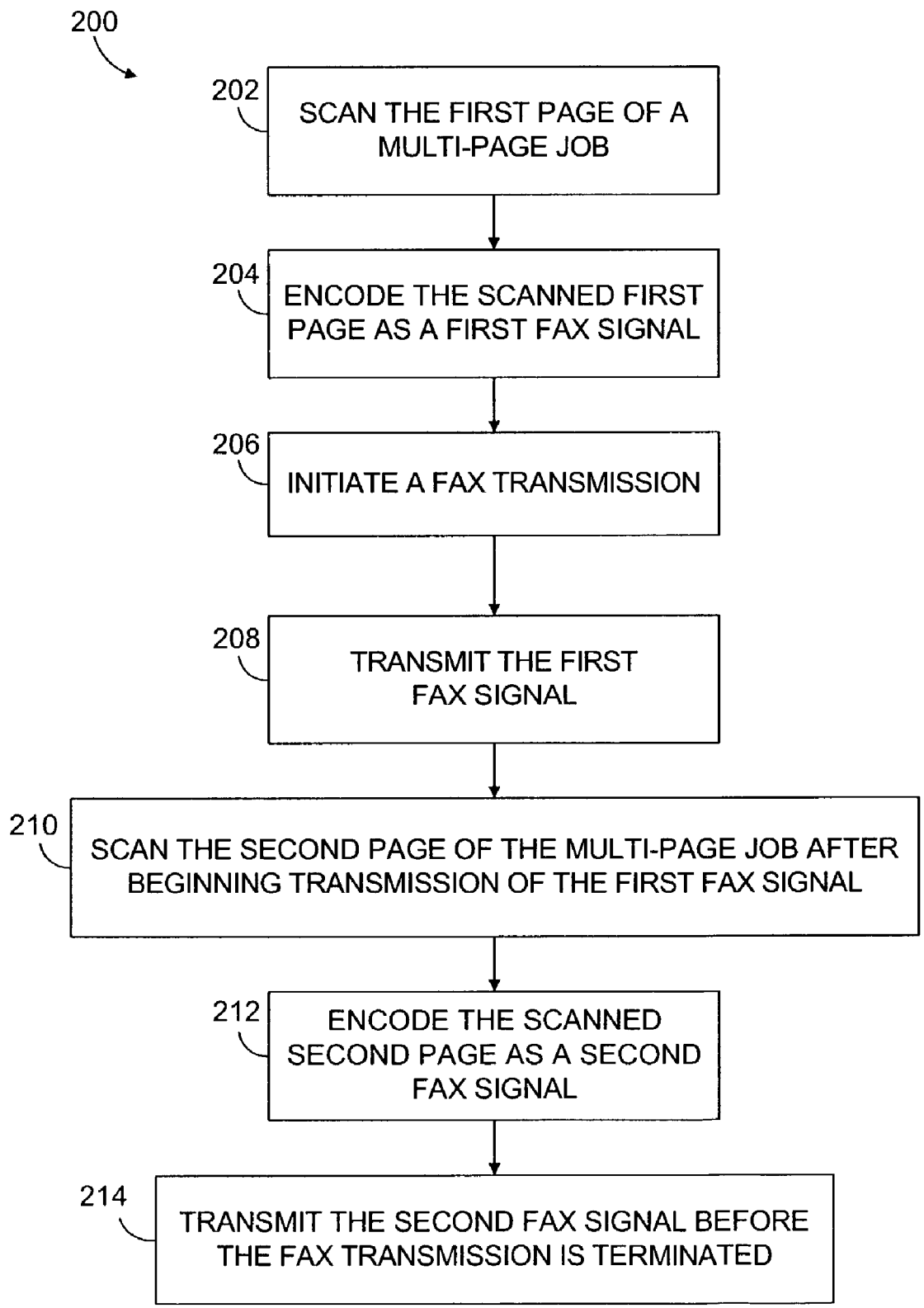
FIG. 4 is a flowchart showing another method of faxing a multi-page job.

FIG. 4 shows, generally at 200, a method of faxing a multi-page job. The method includes, at 202, scanning a first page, and at 204, encoding the first page as a first fax signal. Either immediately preceding, during, or soon after the first page is scanned and encoded, the method includes, at 206, initiating a fax transmission. At 208, the method further includes transmitting the first fax signal. As described herein, the transmission of the first fax signal may be purposefully slowed down, for example to maintain an active connection so that the entire multi-page job may be transmitted in a single connection. At 210, the method includes scanning a second page after beginning transmission of the first fax signal. The second page may be scanned while the first fax signal is being transmitted or after it has been completely transmitted. It is within the scope of the invention to slow transmission of the first fax signal until the second fax signal is encoded, and then speed transmission of the first fax signal. The method further includes, at 212, encoding the second page as a second fax signal. The encoding may take place during or after transmission of the first fax signal. At 214, the method includes transmitting the second fax signal before the fax transmission is terminated. As with the first fax signal, transmission of the second fax signal may be slowed, for example to allow a third page to be scanned, and so on.

The methods described herein may be implemented as software, firmware, or other machine executable code. As such, executable instructions may be coded into a storage medium for implementing various embodiments of the present invention on such a machine. Appropriate storage medium include, but are not limited to, compact discs, digital versatile discs, and other optical media, hard drives, tape drives, disks, and other magnetic media, compact flash, smart media, firmware, and other integrated circuits, as well as other appropriate media.

While embodiments of the present invention have been particularly shown and described, those skilled in the art will understand that many variations may be made therein without departing from the spirit and scope as defined in the following claims. The description should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A method of faxing a multi-page job via a flatbed facsimile device, the method comprising:
   manually scanning a first page of the multi-page job with the flatbed facsimile device;
   encoding the scanned first page as a first fax signal configured to be transmitted via a communications network;
   initiating a fax transmission with a recipient fax device;
   transmitting the first fax signal to the recipient fax device via the communications network;
   prompting a user to scan a second page within an allotted period of time, said allotted period of time being determined in accordance with communications network activity;

manually scanning at least a second page of the multi-page job with the flatbed facsimile device after beginning transmission of the first fax signal;

encoding the scanned second page as a second fax signal configured to be transmitted via the communications network; and transmitting the second fax signal to the recipient fax device via the communications network before the fax transmission is terminated.

2. The method of claim 1, wherein prompting a user to scan a second page within an allotted period of time includes indicating the period of time via a countdown timer.

3. The method of claim 1, wherein transmitting the first fax signal includes slowing transmission of the signal to prevent the fax transmission from terminating.

4. The method of claim 3, wherein slowing the transmission includes transmitting fill bits.

5. The method of claim 3, wherein slowing the transmission includes transmitting ECM flags.

6. The method of claim 3, wherein slowing the transmission includes transmitting a header line configured to compress inefficiently.

7. A facsimile device, comprising:

a scanning subsystem configured to scan a job of one or more pages and encode each page as a fax signal for sending over a communications network;

a user interface for prompting a user to scan consecutive pages of a multipage job within an allotted period of time, said allotted period of time being determined in accordance with communications network activity;

a communication subsystem configured to transmit the fax signal encoded from one page of the multi-page job to a recipient fax device while the scanning subsystem scans another page of the multi-page job, wherein the communications subsystem is configured to add supplemental information to the fax signal to avoid the fax transmission terminating due to inactivity on the communications network.

8. A multifunction device, comprising:

a user interface for prompting a user to scan consecutive pages of a multipage job within an allotted period of time for transmission over a communications network, said allotted period of time being determined in accordance with communications network activity;

a flatbed scanning subsystem configured to scan a job of a plurality of documents and encode the job as at least one of:
  a) a scan file adapted for storage on a nonvolatile computer readable memory, and
  b) a fax-job signal adapted for transmission over a communications network;

an interface configured to transfer the scan file, to the computer readable memory; and a communication subsystem configured to transmit the fax-job signal in a single fax transmission to at least one recipient fax device via the communications network, wherein the fax-job signal is decodable by the recipient fax device as a reproduction of the job.

9. The multifunction device of claim 8, further comprising a printing subsystem configured to print a reproduction of the job, wherein a copy signal encoded by the scanning subsystem is used to print the reproduction.

10. A facsimile device, comprising:

a user interface for prompting a user to scan consecutive pages of a multipage job within an allotted period of time for transmission over a communications network, said allotted period of time being determined in accordance with communications network activity;

scanning means configured to scan a job of a plurality of pages and encode the job as a fax-job signal;

buffer means configured to receive the fax-job signal from the scanning means and temporarily hold the fax-job signal; and communication means configured to transmit the fax-job signal from the buffer means to at least one recipient fax device via the communications network.

11. A facsimile device, comprising:

a user interface for prompting a user to scan consecutive pages of a multipage job within an allotted period of time for transmission over a communications network, said allotted period of time being determined in accordance with communications network activity;

scanning means configured to scan a job of one or more pages and encode each page as a fax signal;

communication means configured to transmit the fax signal encoded from one page of the multi-page job to a recipient fax device while the scanning means scans another page of the multi-page job, wherein the communications means is configured to add supplemental information to the fax signal if the fax transmission would otherwise terminate due to inactivity on the communications network.

12. A facsimile device, comprising:

a user interface for prompting a user to scan consecutive pages of a multipage job within a displayed allotted period of time for transmission over a communications network, said allotted period of time being determined in accordance with communications network activity;

a scanning subsystem configured to scan the multi-page job and to encode the job as a fax-job signal that includes more than one scan signal that respectively correspond to the individual manually scanned pages of the job;

a volatile memory buffer configured to receive the fax-job signal from the scanning subsystem and temporarily hold the fax-job signal; and a communication subsystem configured to receive the fax-job signal directly from the buffer memory and transmit the fax-job signal to at least one recipient fax device in a single fax transmission via the communications network.

13. The facsimile device of claim 12, wherein the communications subsystem is configured to transmit the entire fax job signal after the job is completely scanned and encoded.

14. The facsimile device of claim 12, wherein the communications subsystem is configured to transmit a portion of the fax-job signal before the job is completely scanned and encoded.

15. The facsimile device of claim 14, wherein the communications subsystem is configured to transmit supplemental information to prevent the single fax transmission from terminating.

16. A method of faxing a multi-page job via a flatbed facsimile device, the method comprising:

manually scanning a first page of the multi-page job with the flatbed facsimile device;

encoding the scanned first page as a first fax signal configured to be transmitted via a communications network;

initiating a fax transmission with a recipient fax device;

transmitting the first fax signal to the recipient fax device via the communications network;

prompting a user to scan a second page within a displayed allotted period of time, said allotted period of time being determined in accordance with communications network activity;

manually scanning at least a second page of the multi-page job with the flatbed facsimile device after beginning transmission of the first fax signal;

encoding the scanned second page as a second fax signal configured to be transmitted via the communications network; and transmitting the second fax signal to the recipient fax device via the communications network before the fax transmission is terminated.

17. The method of claim 16, wherein prompting a user to scan a second page within a displayed allotted period of time includes indicating the period of time via a countdown timer.

18. The method of claim 16, wherein transmitting the first fax signal includes slowing transmission of the signal to prevent the fax transmission from terminating.

19. The method of claim 18, wherein slowing the transmission includes transmitting fill bits.

20. The method of claim 18, wherein slowing the transmission includes transmitting ECM flags.

21. The method of claim 18, wherein slowing the transmission includes transmitting a header line configured to compress inefficiently.

22. A multifunction device, comprising:

a user interface for prompting a user to scan consecutive pages of a multipage job within a displayed allotted period of time for transmission over a communications network, said allotted period of time being determined in accordance with communications network activity;

a flatbed scanning subsystem configured to scan a job of a plurality of documents and encode the job as at least one of:
  a) a scan file adapted for storage on a nonvolatile computer readable memory, and
  b) a fax-job signal adapted for transmission over a communications network;

an interface configured to transfer the scan file to the computer readable memory; and a communication subsystem configured to transmit the fax-job signal in a single fax transmission to at least one recipient fax device via the communications network, wherein the fax-job signal is decodable by the recipient fax device as a reproduction of the job.

23. The multifunction device of claim 22, further comprising a printing subsystem configured to print a reproduction of the job, wherein a copy signal encoded by the scanning subsystem is used to print the reproduction.

* * * * *